(No Model.) 5 Sheets—Sheet 1.

J. S. GRAHAM & J. KANE.
WOODWORKING MACHINE.

No. 522,754. Patented July 10, 1894.

Witnesses:
A. Sorge Jr.
C. G. Crannell

Inventors:
Jas. S. Graham &
John Kane.
By Geo. B. Selden
atty.

(No Model.) 5 Sheets—Sheet 2.
J. S. GRAHAM & J. KANE.
WOODWORKING MACHINE.
No. 522,754. Patented July 10, 1894.
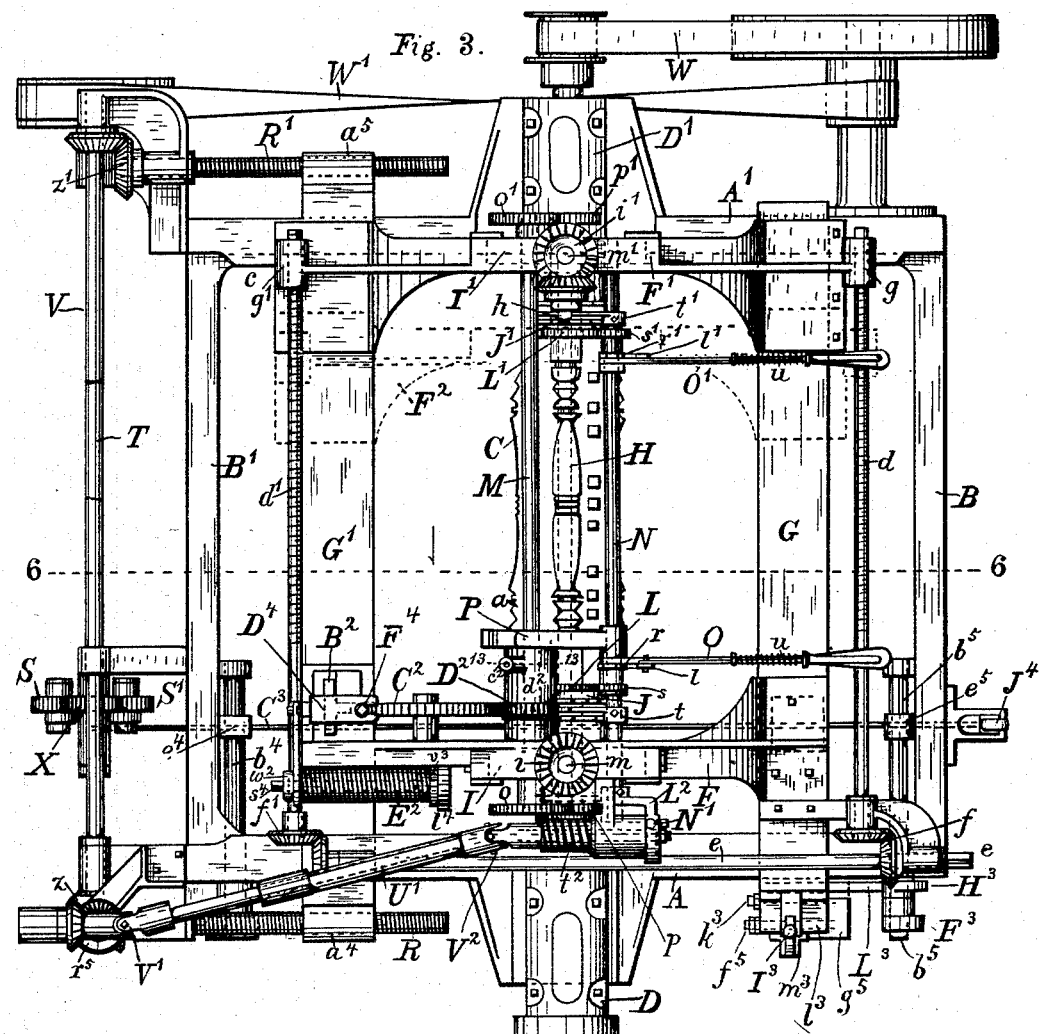
Fig. 3.
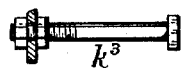
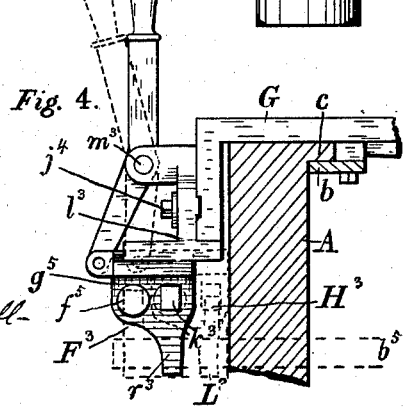
Fig. 4.
Fig. 5.
Witnesses:
A. Sorge Jr
C. G. Cranwell
Inventors:
Jas. S. Graham &
John Kane,
By Geo. B. Selden.
atty.

(No Model.) 5 Sheets—Sheet 3.
J. S. GRAHAM & J. KANE.
WOODWORKING MACHINE.
No. 522,754. Patented July 10, 1894.
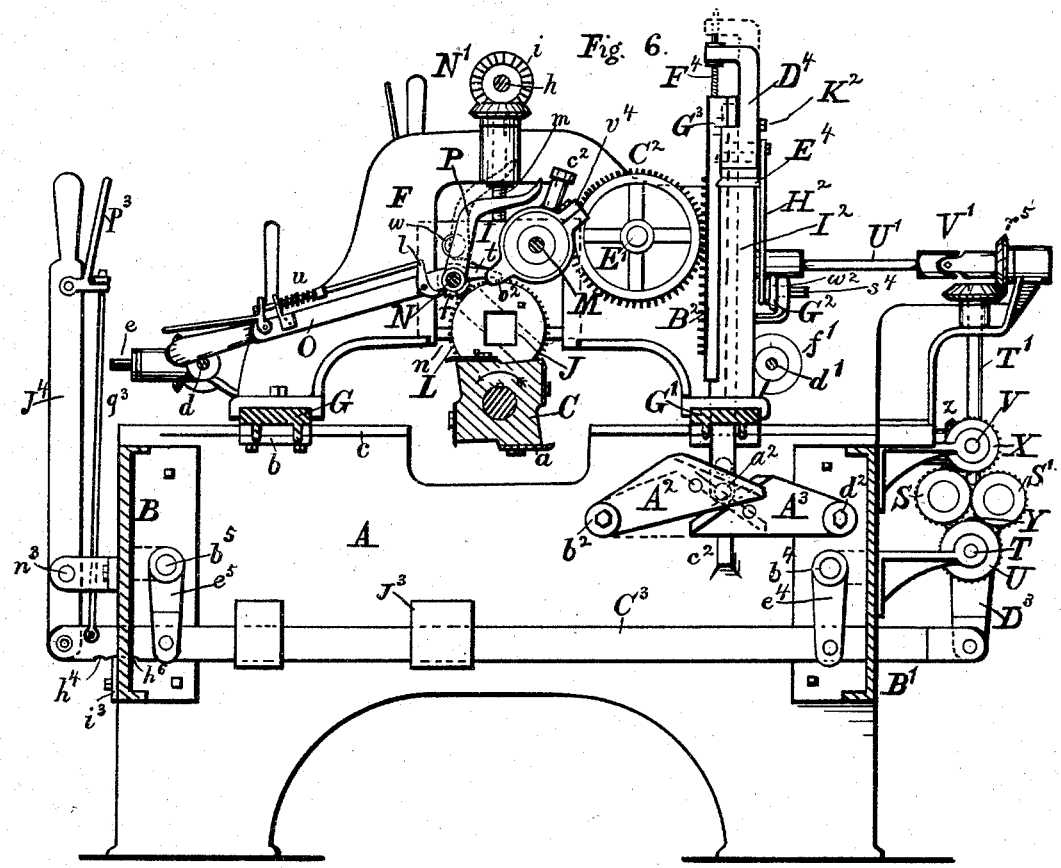
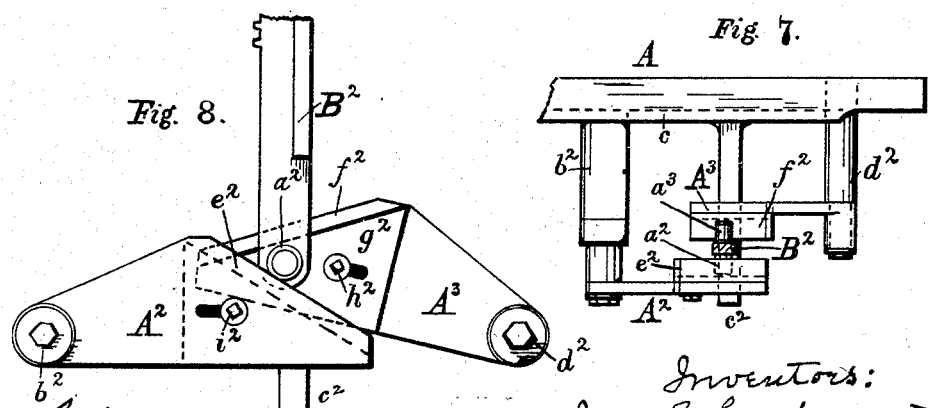
Witnesses:
A. Sorge Jr.
C. G. Crannell
Inventors:
Jas. S. Graham &
John Kane.
By Geo. B. Selden
Atty.

(No Model.) 5 Sheets—Sheet 4.

J. S. GRAHAM & J. KANE.
WOODWORKING MACHINE.

No. 522,754. Patented July 10, 1894.

Witnesses:
A. Sorge Jr.
C. G. Crannell

Inventors:
Jas. S. Graham &
John Kane,
By Geo. B. Selden,
Atty.

(No Model.) 5 Sheets—Sheet 5.

J. S. GRAHAM & J. KANE.
WOODWORKING MACHINE.

No. 522,754. Patented July 10, 1894.

Witnesses:
A. Sorge Jr
C. G. Crannell

Inventors:
Jas. S. Graham &
John Kane,
By Geo. B. Selden,
atty

UNITED STATES PATENT OFFICE.

JAMES S. GRAHAM AND JOHN KANE, OF ROCHESTER, NEW YORK, ASSIGNORS TO HUGH BURKE, OF SCRANTON, PENNSYLVANIA, AND JAMES M. BURKE, OF BUFFALO, NEW YORK.

WOODWORKING-MACHINE.

SPECIFICATION forming part of Letters Patent No. 522,754, dated July 10, 1894.

Application filed April 15, 1893. Serial No. 470,424. (No model.)

*To all whom it may concern:*

Be it known that we, JAMES S. GRAHAM and JOHN KANE, citizens of the United States, residing at Rochester, in the county of Monroe, in the State of New York, have jointly invented certain Improvements in Woodworking-Machines, of which the following is a specification, reference being had to the accompanying drawings.

Our invention relates to certain improvements on the wood-working machine described in the patent of W. E. Taft, No. 434,846, dated August 19, 1890,—which improvements are fully described and illustrated in the following specification and the accompanying drawings,—the novel features thereof being specified in the claims annexed to the said specification.

Our improvements are represented in the accompanying drawings, in which—

Figure 1:
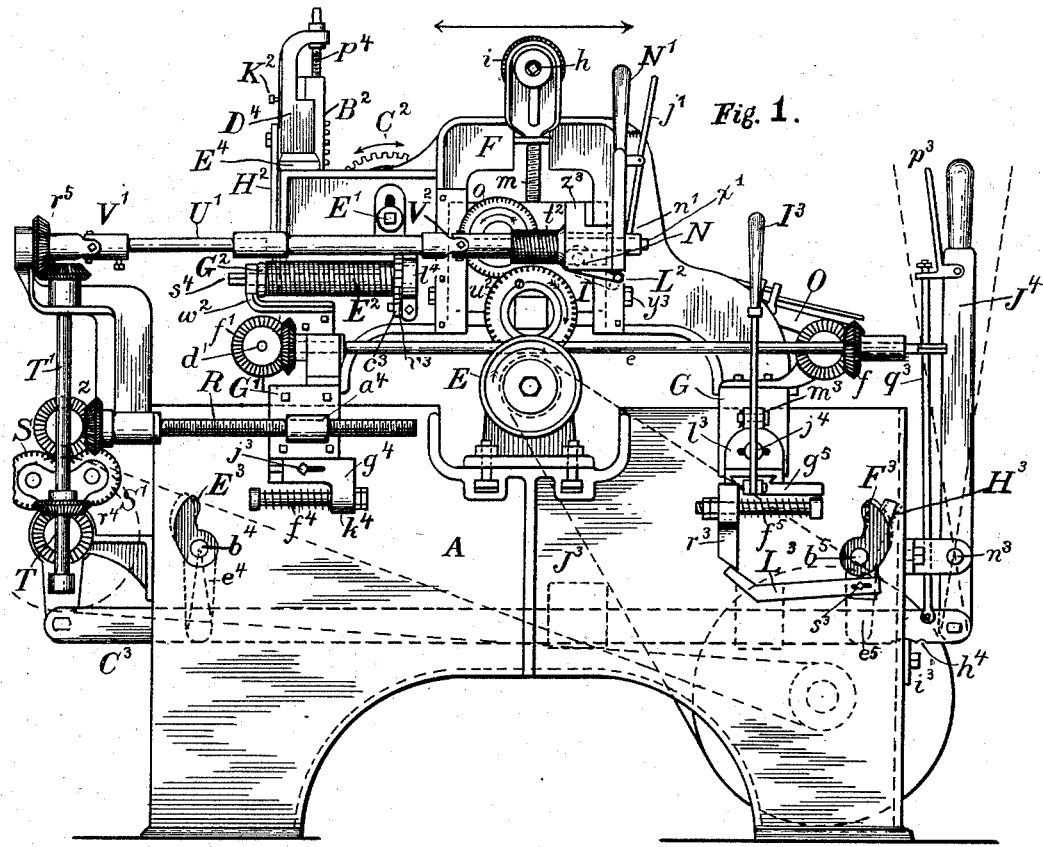
Figure 2:
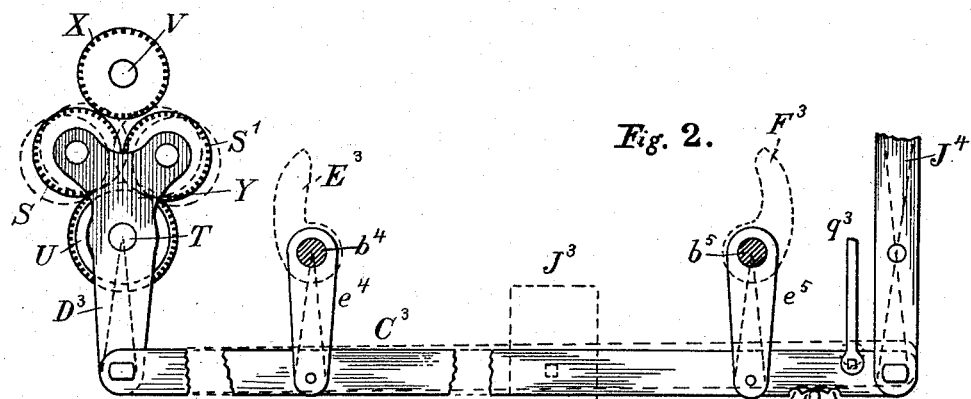
Figure 9:
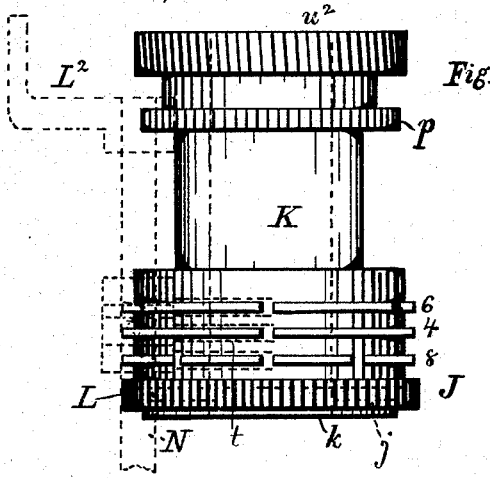
Figure 11:
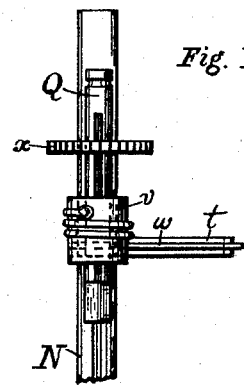
Figure 10:
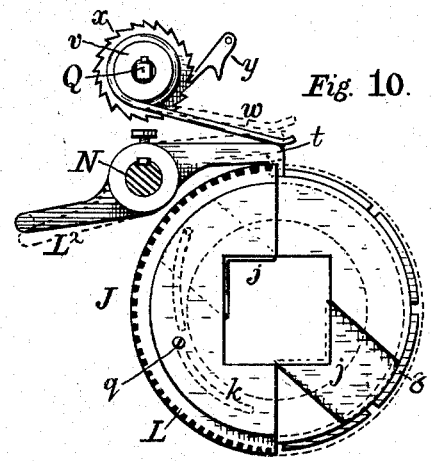
Figure 12:
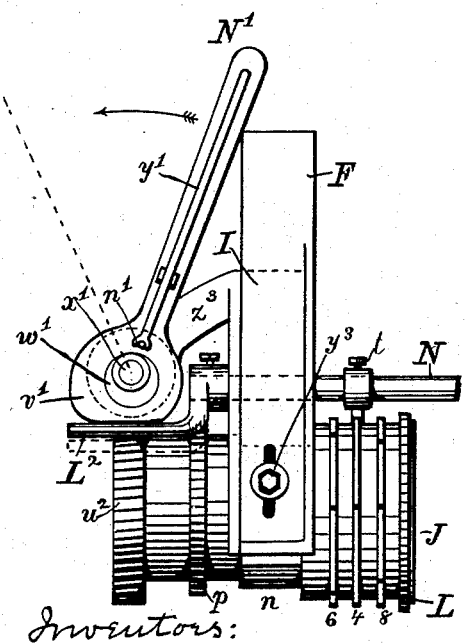
Figure 13:
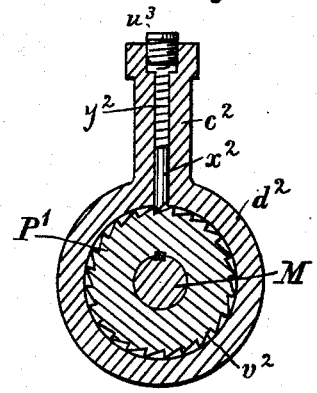
Figure 14:
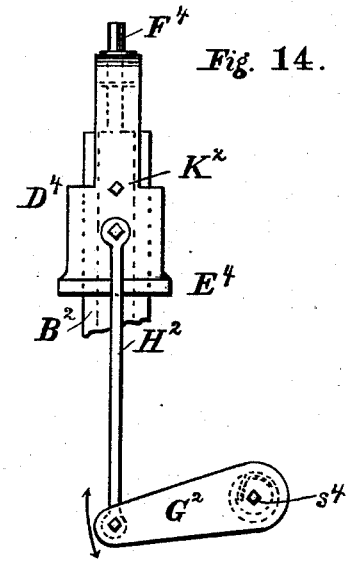
Figure 16:
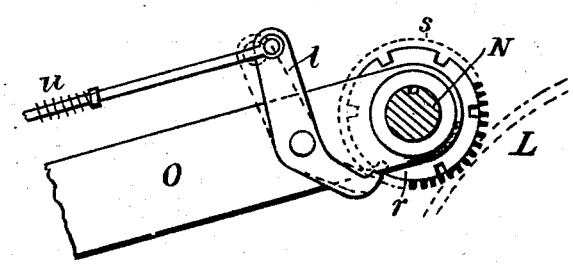
Figure 15:
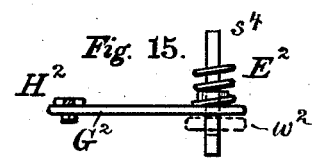

Figure 1 is a side elevation. Fig. 2 represents the reversing mechanism. Fig. 3 is a plan view the shaft $h$ being broken away. Fig. 4 is an end elevation of the lever and slide for controlling the movements of the carriage. Fig. 5 represents a detail. Fig. 6 is a section on the line 6—6, Fig. 3— showing the parts below that line. Fig. 7 is a plan view of the adjustable cams which operate the mechanism by which the wood-holding chucks are rotated. Fig. 8 is a side elevation of the same. Fig. 9 is a plan view of one of the revolving heads, showing the chuck which holds the wood, the notched rings, the driving gear and worm-gear. Fig. 10 is a partial elevation of the chuck, showing the notched rings, the adjustable latch and its spring. Fig. 11 is a plan view of the latch, its spring and ratchet. Fig. 12 represents the hand-lever, eccentric and cam for operating the worm and the latches. Fig. 13 is a section on the line 13—13, Fig. 3, showing the construction of the ratchet on the shaft which operates the wood-holders. Fig. 14 represents the arm and link connection by which the return movement of the rack is produced. Fig. 15 is a plan of the same parts. Fig. 16 represents the ratchet and dog for operating the chuck of the wood-holder.

Our improved wood-working machine consists essentially of a suitable supporting frame, carrying a revolving cutter-head, a carriage, which is provided with rotatable wood-holding chucks, and is arranged to reciprocate relatively to the cutter so as to present the wood thereto, and mechanism for imparting and controlling the reciprocating movements of the carriage, and for giving the chucks a partial revolution at each reciprocation, so as to dress the wood into any desired polygonal shape and also mechanism for causing the chucks to make a complete revolution while the carriage remains stationary, so as to produce cylindrical forms. The knives on the cutter head are made with irregular cutting edges, as indicated in Fig. 3, so as to dress the wood to any desired ornamental form, either circular, square, hexagonal, or octagonal, &c.

In the drawings the frame is represented as consisting of the side-frames A A', connected together by suitable cross-bars B B'.

C is the revolving cutter-head, provided with the knives $a$, having cutting edges of the desired form, and sustained by a shaft journaled in suitable boxes D D' on the side-frames.

E is the driving pulley, by which power is applied to the machine.

The reciprocating carriage consists of the standards F F', connected together by the transverse bars G G', which are arranged to slide on the side-frames A A',—being held down by gibs $b$, Figs. 4 and 6, engaging with the ribs $c$ projecting inward from the side-frames. The standard F is bolted to the bars G G', while the standard F' is gibbed or otherwise fitted to the bars, so that the distance between the standards may be increased or diminished, as indicated by the dotted lines $F^2$, Fig. 3, so as to adapt the machine to working sticks of lumber, H, of different lengths.

$d$ and $d'$ are screws arranged parallel to each other, and connected together by the shaft $e$ and bevel gears $f f'$, by which the adjustment of the standard F' is effected. The screws $d d'$ engage in nuts $g g'$ on the standard F' and are supported in suitable journals on the bars G G' at their other ends.

The shaft $e$ is provided with suitable supports, and at one end it is squared or fitted for the application of a wrench, so as to secure the simultaneous movement of the screws.

Each of the standards F F' is fitted with a head I I', arranged to slide in suitable ways or guides, and connected together by the shaft $h$, bevels $i\ i'$, and screws $m\ m'$, so that the heads may be simultaneously adjusted relative to the cutter C. The standards are provided with suitable openings within which the heads I I' slide. Each of the heads carries a rotary chuck or wood-holding device, J J'—the construction of which is shown more in detail in Figs. 9 and 10. The heads are provided with circular recesses formed partially in their lower edges and partially in the caps, $n$, Fig. 6, in which the circular bodies K, Fig. 9, of the wood-holders revolve.

The simultaneous rotary movement of the wood-holders is secured by the transverse shaft M, journaled in the heads I I', and provided on either end with the gears $o\ o'$, meshing with the gears $p\ p'$ on the bodies of the wood-holders.

Any suitable form of chuck or clamping device may be employed in the wood-holders, to secure it firmly in place therein. A scroll-chuck of an ordinary form, is represented in Fig. 10 in which the sliding jaws $j$ are provided with pins projecting into spiral slots in the plate of the gear L, which is secured to the body of the wood holder by the disk $k$, and screws $q$. By turning the gears L L' the jaws $j$ are caused to slide in and out, so as to clamp or release the wood.

In order to provide a convenient means for operating the chucks, we employ the transverse shaft N, journaled in the heads I I', and the handles O O', provided with dogs $l\ l'$, engaging with ratchets $r\ r'$ on the shaft, which are attached by suitable sleeves to the pinions $s\ s'$, which mesh with the gears L L' on the wood-holders.

The dogs $l\ l'$ are ordinarily held out of engagement with the teeth of the ratchets $r\ r'$ by the springs $u$, but, by grasping the outer end of the handles, the hand-pieces are pressed inward, compressing the springs, and causing the dogs to engage with the teeth of the ratchets, so that the pinions $s\ s'$ and the gears L L' are caused to turn in either direction by a to-and-fro movement imparted to the handles,—thus opening or closing the chucks. The ratchets and pinions are loose on the shaft N, being provided with suitable collars by which they are held in place lengthwise thereof. The shaft N also serves to support the latches $t\ t'$, which engage with the notches in the rings 4, 6 or 8 on the wood-holders. These latches, when engaged in the notches of the rings, serve to prevent the wood-holders from revolving during the cutting operation, so that the wood can be dressed square, hexagonal, or octagonal, according to the number of notches in the ring employed. Provision is made for adjusting the latches lengthwise on the shaft N, as indicated by the dotted lines in Fig. 9, so as to cause them to engage with any one of the rings. The shaft N is slotted lengthwise, and the latches are provided with keys and set screws, by which they are secured to the shaft N so as to be moved simultaneously by a partial rotation of the shaft, to engage or disengage them from the rings on the two wood-holders.

The latches are held in engagement with the notches in the rings by any suitable springs,—a convenient arrangement by which the springs are made variable in tension and adjustable lengthwise, being represented in Figs. 10 and 11, in which Q is a short shaft or stud inserted in a hole in the head I, and carrying a hub $v$, around which the spring $w$ is coiled, and the ratchet-wheel $x$. A pawl $y$ pivoted on the head engages with the teeth of the ratchet. At one end the spring $w$ is fastened to the hub $v$, and the other end rests in a groove in the latch $t$. The stud Q turns in the head,—being secured therein by a set-screw entering a groove or other suitable device. The hub $v$ is splined on the stud Q. The exposed end of the stud is fitted for the application of a wrench, so that the tension of the spring may be varied. For convenience of illustration, the spring and ratchet are omitted in Fig. 3, but it will be understood that both of the latches $t\ t'$ are provided with the springs.

Proceeding now to a description of the mechanism for imparting the reciprocating movement to the carriage, it should be understood that this is effected automatically by reversing the rotation of the feed screws, R R', by means of the change-gears, S S'. Continuous rotary motion is imparted to the shaft T, arranged in suitable supports across the end of the machine, by any suitable means, such as the belts and pulleys W W' shown in Fig. 3, by which the shaft is driven from the cutter-head shaft. The shaft T carries a gear U, which meshes with the gear S', which meshes with the gear S. Parallel with the shaft T is arranged the shaft V, which carries the gear X, and it is provided at each end with the bevel-gears $z\ z'$, by which it is connected with the feed-screws R R'. The gear X is so arranged on the shaft V that either of the gears S or S' may be engaged with it. These gears are supported on a swinging arm Y pivoted on the shaft T. Rotary motion in either direction may be imparted to the shaft V, and consequently to the feed-screws R R', by meshing one or the other of the gears S S' with the gear X. When both the gears S S' are out of mesh with the gear X, the shaft V and the feed-screws and carriage will remain stationary. This is the position indicated by the full lines in Figs. 1 and 2. The feed-screws are connected with the carriage by means of the nuts $a^4\ a^5$ attached to the ends of the bar G'.

In order to cause the carriage to automatically reverse its motion at each end of its travel, we employ the shifter-bar $C^3$, attached at one end to the arm $D^3$ on the frame Y carrying the gears S S', and arrange suitable cams or levers at each end of the path of the carriage, so that the gears S S' will be alternately engaged with the gear X by the movement of the carriage itself. $E^3$ $F^3$ are cams arranged in the path of the carriage at each end thereof, and connected with the shifter-bar $C^3$ by the rock-shafts $b^4 b^5$ and arms $e^4 e^5$. A lug or arm on the carriage comes in contact with the cam $E^3$ at the end of the movement toward the left-hand, and shifts the bar $C^3$ so as to disengage the gear S from the gear X, and engage the gear S' with it, so as to reverse the direction of the rotation of the shaft V and the feed-screws R R'. At the right hand end of the travel of the carriage, a similar operation takes place, the cam $F^3$ being moved, so as to disengage the gear S' from and to engage the gear S with the gear X.

In order to effect the reversal with certainty, we employ the spring bolts, $f^4 f^5$, Fig. 1, which are arranged in adjustable reversing-blocks $g^4 g^5$, carried by the cross-bars G G' of the carriage.

When the spring bolt $f^4$ comes in contact with the cam $E^3$, the spring on it is compressed, until its resistance becomes sufficient to shift the bar $C^3$, disengaging the notch $h^4$ from the plate $i^3$,—after which the spring expands, and forces the bar quickly to the extremity of its travel, insuring the engagement of the gear S' with the gear X, and of the notch $h^6$ with the plate or catch $i^3$. The spring-bolt slides through an eye, $k^4$ on the reversing-block $g^4$, which is made adjustable lengthwise by the screw $j^3$ passing through a slot in the block and threaded into the lower part of the arm attached to the cross-bar G' which carries the nut $a^4$ of the feed-screw R. The end of the spring-bolt which comes in contact with the cam $E^3$ is enlarged, and its other end is provided with jam-nuts by which the tension of the spring may be adjusted.

The construction and arrangement of the spring-bolt $f^5$, Fig. 1, which comes in contact with the cam $F^3$, is similar to that already described for the spring-bolt $f^4$, except that, in order to provide for stopping the reciprocation of the carriage at the right hand end of its travel, where the wood is most conveniently removed or replaced, the reversing block $g^5$ is made to slide to and from the side-frame A, as indicated most plainly in Fig. 4,—so as to bring the spring-bolt $f^5$ out of line with the cam $F^3$. The rock-shaft $b^5$ is provided with an auxiliary cam $H^3$. The reversing block $g^5$ carries an additional push-bolt or striker, $k^3$, Figs. 4 and 5.

When the operator desires to stop the movement of the carriage at its right hand end, he pulls the lever $I^3$ outward, shifting the reversing block $g^5$, from the position shown in full lines in Fig. 4 to that represented by the dotted lines, and moving the spring-bolt $f^5$ out of line with the cam $F^3$, and bringing the push-bolt $k^3$ into line with the auxiliary cam $H^3$, so that, there being no spring on the bolt $k^3$, the shifter bar $C^3$ will only be moved far enough to disengage the gear S' from the gear X,—the bar resting with the shallow notch $h^5$ on the plate $i^3$. In this case both the change-gears are disengaged from the gear X, and the carriage remains stationary at the extremity of its travel to the right. The shifter bar $C^3$ is provided with one or more adjustable weights $J^3$, by the adjustment of which lengthwise, the amount of resistance offered by the notches $h^4$, $h^5$, $h^6$ against disengagement from the plate $i^3$ may be varied. The reversing block $g^5$ is fitted by a dovetailed slide to an adjustable block $l^3$, secured by bolt $j^4$ to an arm projecting downward from the cross-bar G. The lever $I^3$ is pivoted to the blocks $l^3$ and $m^3$, and its lower end is jointed to the sliding reversing block $g^5$. The push-bolt $k^3$ is provided with jam-nuts, arranged on each side of a flange projecting downward from the reversing-block as indicated in Fig. 5,—so that it may be adjusted lengthwise.

If the operator now desires to start the carriage again into operation, he brings the spring-bolt $f^5$ into line with the cam $F^3$ by pushing the upper end of the lever $I^3$ inward, and then, by means of the lever $J^4$, pivoted at $n^3$, he disengages the central notch $h^5$ in the shifter bar from the plate $i^3$, and shifts the bar so as to cause the gear S to mesh with the gear X. The carriage will now continue to reciprocate so long as the arrangement described is maintained. In order to facilitate the disengagement of the notches from the plate, we provide the lever $J^4$ with a pivoted hand-piece, $p^3$, connected by a rod $q^3$ with the shifter bar $C^3$,—so that, by pressure on the hand-piece, the shifter is lifted positively a short distance, as indicated by the full and dotted lines in Fig. 2. The joints between the bar and the lever $J^4$ and the arms $e^4 e^5$ are slotted to permit this movement. If however the operator desires to move the carriage until the wood holders are directly over the cutter,—in position for doing round work, he leaves the reversing block $g^5$ in the position in which the push-bolt $k^3$ is in line with the auxiliary cam $H^3$, and starts the carriage, which will now move inward, until, when the wood-holders are directly over the cutter head, the arm $r^3$ on the reversing block $g^5$ will come in contact with the lever $L^3$, connected with the rock-shaft $b^5$, (in line with cam $H^3$,) which lever will be pushed downward, thereby shifting the bar $C^3$ and stopping the motion of the carriage. The carriage may be now again returned to the right hand end of its travel, by the use of the lever $J^4$. The lever $L^3$ is adjustably connected to a lug on the boss of the cam $H^3$, by means of a screw, $s^3$, Fig. 1, passing through a slot in the lever. The inner end of the lever $L^3$ is turned upward into the path of the arm $r^3$. By the proper adjustment of the lever, the carriage may be stopped with the centers of the wood-holders exactly over the center of rotation of the cutter-head C.

In order to impart a continuous revolution to the wood-holders, for turning round work, we drive one of the wood-holders by a worm, $t^2$ and worm-gear $u^2$. It is necessary to provide means for engaging and disengaging the worm and worm-gear, and also for lifting the latches $t$ $t'$ out of the notches in the rings on the wood-holders, and for keeping them out while the wood-holders are revolving. Both of these purposes we accomplish by means of the hand-lever N', which operates an eccentric which moves the worm into engagement with the worm-gear, and also acts as a cam to turn the shaft N and hold the latches away from the rings. The shaft N extends beyond the head I, and is provided with a bent arm $L^2$, which is depressed by the movement of the lever N' so as to lift the latches out of the notches in the rings.

The operation is indicated by the full and dotted lines in Figs. 1, 10, and 12. As the lever N', is swung outward, the cam portion $v'$, Fig. 12, of the lever, depresses the arm $L^2$ and turns the shaft N so as to raise the latch $t$ out of the notch in the ring on the wood-holder. The latch $t'$ will also be lifted at the same time. The latches will remain in their elevated position as long as the lever N' remains turned outward, that is as long as the worm $t^2$ is engaged with the worm-gear $u^2$. The worm is supported by a spindle, $x'$, passing through an eccentric sleeve $w'$, Fig. 12, arranged to turn in the arm $z^3$ projecting outward from the head I. The eccentric sleeve $w'$ is fastened to the lever N' and turns with it, so that when the lever is swung outward, the spindle $x'$ and the worm $t^2$, are lowered so that the latter engages with the worm-gear $u^2$. The rotation of the worm then drives the wood-holder in the standard F and this movement is transmitted to the wood-holder in the other standard by the shaft M and the gearing already described. $y'$ is a lever provided with a spring and pivoted to the lever N', by which the pin $n'$ is withdrawn from a hole in the arm $z^3$, when it is desired to engage the worm with the worm-gear. The pin $n'$ serves to prevent the accidental engagement of the worm and worm-gear. The spindle $x'$ is provided with a collar at its end.

In order to provide for driving the worm $t^2$, while at the same time permitting the adjustment of the wood-holders relatively to the cutter-head, and the reciprocation of the carriage, we make use of the upright shaft T' and the telescoping shaft U', provided with universal joints V' $V^2$. The shaft T' is driven from the shaft T by the bevel-gears $r^4$, and at its upper end it transmits motion, through the bevel-gears $r^5$, to one member of the universal joint V'. One part of the telescoping shaft U' is splined and slides within the other during the reciprocating movement of the carriage, or, if desired, the shaft may be easily detached and taken off in case the machine is to be used for some time on polygonal shapes. The bevels at the upper end of the shaft T' are supported by a suitable bracket. The ratchet on the shaft M permits it to revolve when the worm is used to rotate the wood-holders, without interfering with the gear $C^2$ or the rack $B^2$. The pinions $s$ $s'$ and ratchets $r$ $r'$ turn freely on the shaft N when the wood-holders and gears L L' are revolved in turning cylindrical shapes,—the dogs $l$ $l'$ being held away from the ratchets by the springs $u$.

The mechanism for imparting a suitable intermittent, rotary motion to the wood-holders consists essentially of the pivoted adjustable cams $A^2$ $A^3$, Figs. 6, 7, and 8 operating the sliding rack $B^2$, the gear $C^2$, and pinion $D^2$, Fig. 3, on the shaft M. As already mentioned, the shaft M is geared at its ends to the wood-holders, so that the latter revolve simultaneously. As the carriage reciprocates, the cams $A^2$ $A^3$ cause the rack $B^2$ to slide upward and this motion is transmitted to the shaft M and the wood-holders, by the gear $C^2$ and pinion $D^2$, Fig. 3, the return movement being secured by the spring $E^2$, Fig. 1, which is connected with the rack by a swinging arm $G^2$ and link $H^2$. The upward movement of the rack disengages the latches $t$ $t'$ from the notches in the rings of the wood-holders, by causing the cam or lug $o^2$, Fig. 6, which turns on the shaft M, to come in contact with the arm P on the shaft N carrying the latches. The return or downward movement of the rack turns the shaft M so as to rotate the wood-holders. The cam $o^2$ and the pinion $D^2$ move together,—a ratchet being interposed between them and the shaft M. As the cam $o^2$ returns to the position shown by the full lines in Fig. 6, the springs $w$ force the latches down into contact with the rings, so that their points enter those notches in the rings which are next brought opposite to them by the movement of the wood-holders. The movement of the rack $B^2$ is indicated by the full and dotted lines in Fig. 6. The cams $A^2$ $A^3$ serve to raise the rack $B^2$ during the latter part of the movement of the carriage in each direction, so as to give the wood a partial rotation twice during each complete reciprocation,—the cutter C consequently acting on the wood as the latter is presented to it from either direction. The lower end of the rack $B^2$ is provided with the rollers $a^2$ $a^3$, which project outward from it in opposite directions. The cam $A^2$ is pivoted on an arm or stud $b^2$, projecting inward from the side-frame A, and the cam $A^3$ is pivoted on a similar stud $d^2$. The free ends of the cams project inward, resting on an arm $c^2$ which sustains them. The cam $A^2$ is provided with an inwardly projecting inclined flange $e^2$, arranged in line with the roller $a^2$ so as to come in contact therewith as the latter is carried along by the carriage. The cam $A^3$ is provided with a corresponding projecting flange, $f^2$, arranged in line with the roller $a^3$, but inclined in the opposite direction from the flange $e^2$. The flange $f^2$ is made adjustable lengthwise by being attached to the arm of the cam by the slotted plate $g^2$, Fig. 8, and the screw $h^2$. The flange $e^2$ is in a corresponding way made adjustable by a plate and the screw $i^2$.

While the carriage is traveling from left to right in Fig. 6, the roller $a^3$ comes against the lower side of the flange $e^2$ and lifts the cam $A^2$, as indicated by the full lines in Fig. 6, and the roller $a^2$ passes along the upper side of the flange $f^2$ of the cam $A^3$. The rack $B^2$ is thus lifted until the roller $a^3$ passes beyond the flange $f^2$, when the rack falls, under the influence of the spring $E^2$, and, during the return movement of the carriage, the roller $a^3$ passes under the flange $f^2$, raising it, as indicated in Fig. 8, while the roller $a^2$ travels up the flange $e^2$ of the cam $A^2$, again raising the rack, but permitting it to fall as soon as the roller moves beyond the upper end of the flange $e^2$.

It will thus be seen that the rack is forced downward quickly at or near the end of each reciprocating movement of the carriage and that this movement of the rack operates to impart a partial rotation to the wood-holders through the gear $C^2$, the pinion $D^2$, shaft M and gearing $o\,p$, $o'\,p'$.

It will also be understood that it is necessary to turn the wood-holders through a longer arc when the machine is dressing the lumber square in section than when making hexagonal or octagonal shapes, and in order to do this we arrange to give the rack $B^2$ a variable amount of movement, according to the form desired. For this purpose the rack $B^2$ is provided with an adjustable stop, which limits its downward movement, and consequently the distance which it can be raised by the inclined flanges $e^2\,f^2$ of the cams $A^2\,A^3$.

In cutting square work, the whole or nearly the whole of the inclined surfaces of the cam-flanges is employed, while for polygonal shapes a portion only of these surfaces will impart the requisite amount of movement to the rack.

$D^4$, Fig. 6, represents the adjustable stop, which rises and falls with the rack, and in its lowest position rests upon the upper end of the guide-way $I^2$ in which the rack travels,—a buffer $E^4$, of india-rubber, being interposed at this point. $F^4$ is a screw, arranged to turn in a projecting arm on the stop, and threaded into the upper end of the rack. By means of the screw $F^4$, the position of the rack may be adjusted so as to vary the relation of the rollers at the lower end of the rack $B^2$ with the cams $A^2\,A^3$.

A scale may be made on the rack at any convenient point, as at $G^3$, Fig. 6, to indicate the position in which the rack should be set for working on different shapes.

A set-screw $K'$, Figs. 1 and 6, is used, to secure the rack $B^2$ to the part $D^4$, after it has been adjusted to the proper relative position by the screw $F^4$.

By making the inclined flanges $e^2\,f^2$ of the cams $A^2\,A^3$ adjustable lengthwise of the cams, we are enabled to vary the points at which the rack $B^2$ begins and ends its upward travel relatively to the reciprocations of the carriage,—by which we are enabled to save time in the running of the machine by varying the length of the reciprocation of the carriage,—which may be shortened for sticks of small diameter.

In varying the distance of the wood-holders from the cutter, which is done by turning the screws, $m\,m'$ by the cross-shaft $h$ and bevels $i\,i'$, so as to adapt the machine to turning or shaping lumber of different diameters, it may be necessary to adjust the gear $C^2$, and this is provided for by supporting the gear on a stud, $E'$, Figs. 1 and 6, which passes through a slotted opening in the standard F, and is secured by a nut or bolt. By this means an adjustment is provided by which the pinion $D^2$ on the shaft M is kept in proper mesh with the gear $C^2$, whether the wood-holders are set close to or at a distance from the cutter-head.

The holes through the wood-holders are cylindrical except at their inner ends, where the clamping devices are located. The side-frames A A' are cored, to secure lightness and strength.

The construction of the ratchet on the shaft M will be understood from the sectional view, Fig. 13. $P'$ is a collar fastened on the shaft and having a series of ratchet teeth $v^2$ formed in its surface in position to engage with the pawl $x^2$, which is arranged to slide in a hole or way in the projecting arm $c^2$ on the sleeve $d^2$. The gear $D^2$ is secured to one end of the sleeve $d^2$ and the cam $o^2$, Fig. 6, to the other.

The sleeve turns the shaft in one direction, by means of the pawl, but the shaft can revolve in the sleeve,—the teeth of the ratchet pushing the pawl outward. $y^2$ is a spring which forces the pawl inward, and $u^3$ a plug which holds the spring in place. The ratchet $P'$ has twenty-four teeth, so that the wood-holders can be turned one-fourth, one-sixth or one-eighth of a revolution at each movement of the rack $B^2$.

The spring $E^2$ which secures the return movement of the rack $B^2$, and operates the wood-holders, is attached to the standard F, by the socket-piece $l^4$, Fig. 1, and the bracket $w^2$. $s^4$ is a shaft which extends entirely through the spring, being arranged to turn in the bracket and socket piece,—and provided with the ratchet $v^3$ which has a hub to which the end of the spring is fastened. The other end of the spring is attached to a hub on the arm $G^2$, which is connected by the link $H^2$ with the adjustable stop $D^4$, as shown in Fig. 14. The arm $G^2$ turns freely on the shaft $s^4$. A pawl, $c^3$, Fig. 1, pivoted on the socket-piece $l^4$, engages with the teeth of the ratchet $v^3$. The outer end of the shaft $s^4$ is fitted for the application of a wrench and it will thus be seen that by turning the shaft, the tension of the spring may be adjusted, the pawl engaging with the teeth of the ratchet, and maintaining the tension of the spring. As the rack $B^2$ and the stop $D^4$ move upward, the arm $G^2$ turns on the shaft $s^4$, compressing the spring,—the power of which secures a quick return movement of the rack, which is cushioned by the buffer $E^4$ interposed between the lower end of the stop and the standard F.

The shaft $h$ which connects the screws $m$ $m'$ by which the heads I I' are raised or lowered, is splined, and the bevel-gear $i'$ on it slides through it when the standard F' is adjusted to adapt the machine to long or short lumber. In a similar manner the shaft M is splined to slide through the gear $o'$. The latch $t'$ and pinion and ratchet $s'$ $r'$ are also adjustable lengthwise of the shaft N.

The cam $o^2$ is formed on a ring which is divided and clamped on the sleeve $d^2$, as indicated at $v^4$, Fig. 6, so that the cam can be adjusted to time its action on the arm P to lift the latches.

It will be observed that by providing the rings 4, 6 and 8 with four, six and eight notches respectively, we are enabled to adapt the machine to dressing square, hexagonal and octagonal forms. The rings are conveniently formed in one piece by placing the ring having four notches between the other two rings, in which case the middle ring can be notched by planing through every other one of the notches of the eight-notched ring.

Our improved wood-working machine may be made of any suitable dimensions, adapted to dressing ornamental forms of any desired length or diameter, either circular or polygonal as may be preferred. The machine can also be used for dressing twelve sided forms.

Provision is made for fastening the heads I I' in any position relative to the cutter in which they may be set, by means of the bolts, $y^3$, Fig. 12.

We claim—

1. The combination, with the supporting frame and the cutter, of the reciprocating carriage provided with the wood-holders, the spring-bolt $f^4$, the movable spring-bolt $f^5$, and push-bolt $k^3$, the cams $E^3$ $F^3$, and $H^3$, shifter-bar $C^3$, and suitable change-gears operated by the shifter-bar, substantially as described.

2. The combination, with the supporting frame and cutter, of the reciprocating carriage, provided with the wood-holders, the movable push-bolt $k^3$ and arm $r^3$, the cam $H^3$ and stop-lever $L^3$, the shifter bar and suitable change-gears adapted to be operated by the shifter-bar, substantially as described.

3. The combination, with the supporting frame and cutter, of the reciprocating carriage, the spring-bolt $f^4$, the movable reversing block $g^5$, carrying spring bolt $f^5$ and push bolt $k^3$, the cams $E^3$, $F^3$ and $H^3$, the shifter bar and suitable change-gears, substantially as described.

4. The combination, with the reciprocating carriage of the rotatable wood-holders J J', provided with one or more notched rings, and connected so as to revolve together, a worm gear attached to one of the holders, a shiftable worm for operating the worm-gear, latches adapted to engage in the notches in the rings, and suitable connecting mechanism, whereby the latches are disengaged from the rings while the worm is engaged with the worm-gear, substantially as described.

5. The combination, with the carriage, of the wood-holders J J', provided with one or more notched rings, and connected so as to revolve together, the worm-gear $u^2$ attached to one of the holders, the shiftable worm $t^2$, the shaft N carrying latches $t\,t'$, and arm $L^2$, the cam-lever N', arranged to engage the worm with the worm-gear, and to disengage the latches from the rings, substantially as described.

6. The combination, with the supporting frame and cutter, of the reciprocating carriage, provided with the wood-holders J J', the worm-gear $u^2$ attached to one of the holders, the shiftable worm $t^2$, and the telescoping shaft U' provided with one or more universal joints, substantially as described.

7. The combination, with the reciprocating carriage, of the wood-holder J, provided with gear L, the pinion $s$, ratchet $r$, and lever O, provided with dog $l$ and spring $u$, substantially as described.

8. The combination, with the supporting frame provided with plate $i^3$, of the cutter C, the reciprocating carriage provided with the wood-holders, suitable change-gearing operated by the carriage, the shifter-bar $C^3$, provided with notches $h^4$ $h^6$, the hand-lever $J^4$, hand-piece $p^3$ and rod $q^3$, substantially as described.

9. The combination, with the supporting frame and cutter of the reciprocating carriage containing the wood-holders, the pivoted cam $A^3$, provided with adjustable inclined flange $f^2$, the rack $B^2$, and suitable connecting mechanism whereby the motion of the rack is transmitted to the wood-holders, substantially as described.

10. The combination, with the supporting frame and cutter, of the reciprocating carriage containing the wood-holders, the pivoted cams $A^2$ $A^3$ provided with inclined flanges $e^2$ $f^2$, the rack $B^2$, suitable connecting mechanism whereby the motion of the rack is transmitted to the wood-holders, and the spring $E^2$, whereby the return movement of the rack is secured, substantially as described.

11. The combination, with the supporting frame and cutter, of the reciprocating carriage, containing the wood-holders, the pivoted cams $A^2$ $A^3$, provided with oppositely inclined flanges $e^2$ $f^2$, the rack $B^2$ provided with adjustable stop $D^4$, suitable connecting mechanism for transmitting the movement of the rack to the wood-holders, and the spring $E^2$, whereby the return movement of the rack is insured, substantially as described.

12. The combination, with the supporting frame and cutter, of the reciprocating carriage containing the wood-holders, the pivoted cams $A^2$ $A^3$ having oppositely inclined adjustable flanges $e^2$ $f^2$, the rack $B^2$, and suitable connecting mechanism whereby the motion of the rack is transmitted to the wood-holders, substantially as described.

13. The combination, with the frame and cutter, of the reciprocating carriage containing the wood-holders, the pivoted cam $A^3$ having inclined flange $f^2$, the rack $B^2$, stop $D^4$, spring $E^2$, and suitable connecting mechanism whereby the motion of the rack is transmitted to the wood-holder, substantially as described.

14. The combination, with the reciprocating carriage and cutter, of the wood-holders J J', provided with notched rings 4, 6 and 8, the shaft N and adjustable latches $t$ $t'$, attached to the shaft so as to be adjusted lengthwise thereon, substantially as described.

15. The combination, with the wood-holder J, provided with notched rings 4, 6 and 8, of the latch $t$, arranged to be adjusted lengthwise on its support, and the correspondingly adjustable spring $w$, substantially as described.

16. The combination, with the supporting frame and cutter, the reciprocating carriage carrying the wood-holders J J' connected together by shaft M and suitable gearing, the worm-gear $u^2$ attached to one of the holders, the shiftable worm $t^2$, the telescoping shaft U' provided with one or more universal joints, the bevels $r^5$ and the upright shaft T', and suitable connections whereby the shaft is operated from the cutter, substantially as described.

JAMES S. GRAHAM.
JOHN KANE.

Witnesses:
GEO. B. SELDEN,
R. F. OSGOOD.